United States Patent
Nathan

[11] Patent Number: 5,845,459
[45] Date of Patent: Dec. 8, 1998

[54] INSULATING TILE

[76] Inventor: Roger B. Nathan, 115 The Crescent, Epsom, Surrey, United Kingdom, KT18 7LN

[21] Appl. No.: 997,926

[22] Filed: Dec. 24, 1997

[51] Int. Cl.$^6$ .................................................. E04C 2/34
[52] U.S. Cl. ..................... 52/788.1; 52/794.1; 52/795.1; 52/787.11; 52/2.16; 52/144; 52/406.2; 52/406.3; 181/284; 181/285; 428/69; 428/76
[58] Field of Search ................... 52/783.1, 788.1, 52/794.1, 795.1, 787.1, 787.11, 2.16, 2.22, 144, 145, 406.2, 406.3; 181/284, 285, 294; 428/69, 76, 133

[56] References Cited

U.S. PATENT DOCUMENTS

| | | | |
|---|---|---|---|
| 19,348 | 2/1858 | Cornell | 52/795.1 |
| D. 249,966 | 10/1978 | Marquis | D25/161 |
| 844,944 | 2/1907 | Jacobs | 52/784.11 |
| 1,522,708 | 1/1925 | Andrews | 52/406.3 |
| 2,233,190 | 2/1941 | Amorosi | 52/788.1 |
| 3,318,064 | 5/1967 | Mayfield et al. | 52/794.1 |
| 3,769,770 | 11/1973 | Deschamps et al. | 52/788.1 X |
| 3,936,553 | 2/1976 | Rowe | 52/789.1 X |
| 4,237,178 | 12/1980 | Mazaki | 181/294 X |
| 4,420,922 | 12/1983 | Wilson | 52/788.1 |
| 4,713,275 | 12/1987 | Riccitiello et al. | 428/76 |
| 4,791,773 | 12/1988 | Taylor | 52/788.1 X |
| 4,832,153 | 5/1989 | Daw et al. | 52/186 X |
| 4,959,111 | 9/1990 | Kruck et al. | 428/69 X |
| 5,094,318 | 3/1992 | Maeda et al. | 181/294 X |
| 5,168,674 | 12/1992 | Molthen | 52/2.16 |
| 5,175,975 | 1/1993 | Benson et al. | 52/788.1 |
| 5,318,108 | 6/1994 | Benson et al. | 52/788.1 X |
| 5,433,050 | 7/1995 | Wilson et al. | 52/302.1 |
| 5,500,305 | 3/1996 | Bridges et al. | 52/788.1 X |
| 5,532,034 | 7/1996 | Kirby et al. | 428/69 |

FOREIGN PATENT DOCUMENTS

| | | | |
|---|---|---|---|
| 66786 | 1/1940 | Czechoslovakia | 52/783.1 |
| 1335129 | 7/1963 | France | 52/783.1 |
| 2827818 | 1/1980 | Germany | 52/783.1 |
| 2-91353 | 3/1990 | Japan | 52/783.1 |
| 683855 | 12/1952 | United Kingdom | 52/788.1 |

Primary Examiner—Carl D. Friedman
Assistant Examiner—Laura A. Callo

[57] ABSTRACT

A new insulating tile for providing heat and sound insulation to wall and floor surfaces. The inventive device includes front and back plates each having inner and outer surfaces. Around the outer perimeter of the front plate is a side wall outwardly extending from its inner surface. The terminal edge of the side wall is coupled to the inner surface of the back plate to form a substantially air tight seal therebetween. The inner surfaces of the plate members are spaced apart to define an insulating interior space between them. A closure tab is outwardly extended from the inner surface of the front plate and is inserted into an aperture extending through the inner and outer surfaces of the back plate. The closure tab is designed for providing a substantially air tight closure of the aperture. The air pressure within the interior space is less than the relative air pressure of the environment surrounding the exterior of the insulating tile to provide further insulation properties to the interior space.

11 Claims, 4 Drawing Sheets

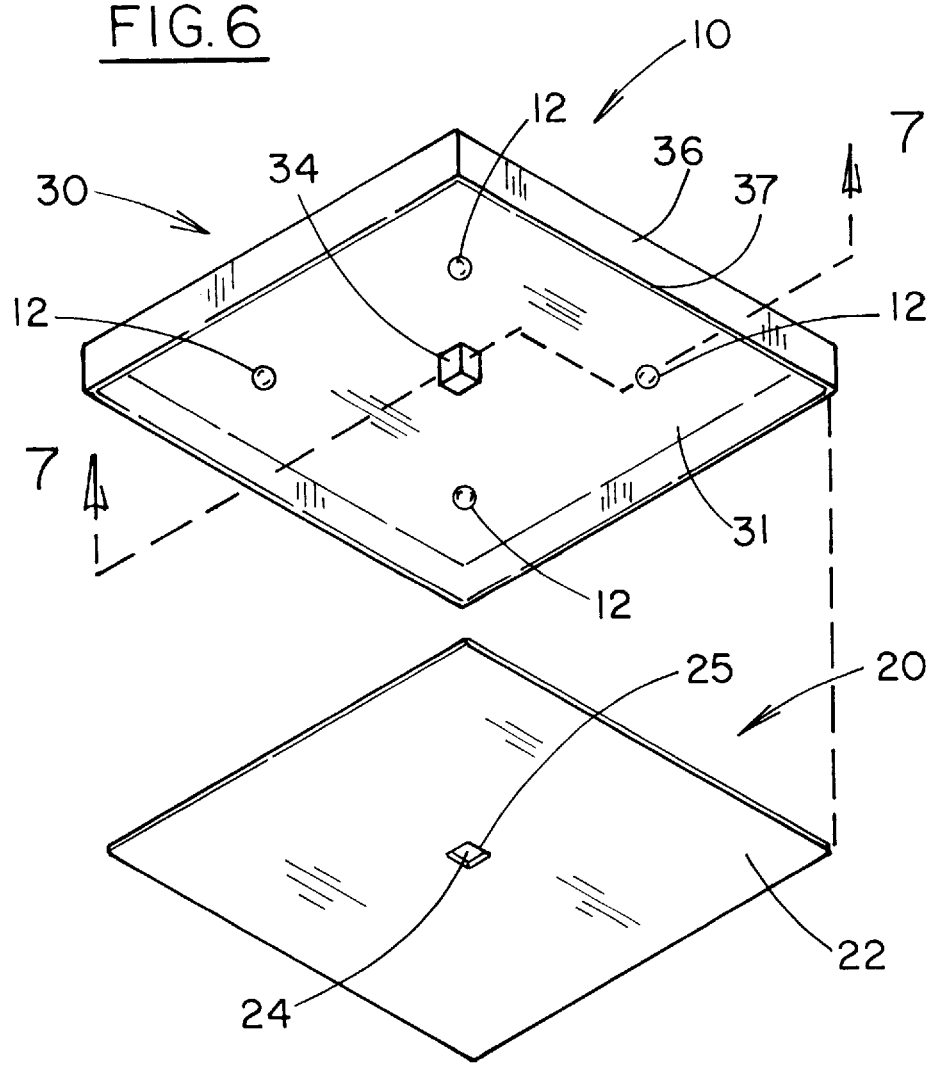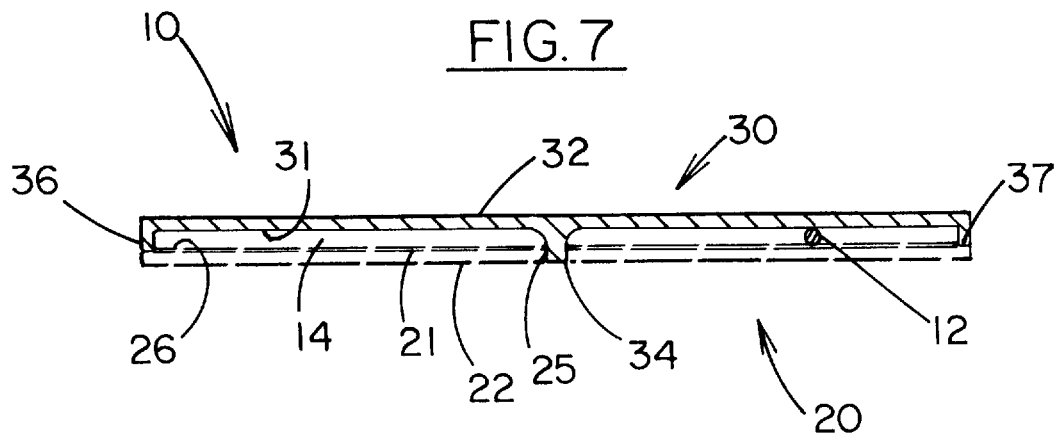

INSULATING TILE

BACKGROUND OF THE INVENTION

1. Field of the Invention

The present invention relates to insulating wall and floor tiles and more particularly pertains to a new insulating tile for providing heat and sound insulation to wall and floor surfaces.

2. Description of the Prior Art

The use of insulating wall and floor tiles is known in the prior art. More specifically, insulating wall and floor tiles heretofore devised and utilized are known to consist basically of familiar, expected and obvious structural configurations, notwithstanding the myriad of designs encompassed by the crowded prior art which have been developed for the fulfillment of countless objectives and requirements.

Known prior art insulating wall and floor tiles include U.S. Pat. No. 5,094,318; U.S. Pat. No. 4,237,178; U.S. Pat. No. 4,713,275; U.S. Pat. No. 4,832,152; U.S. Pat. No. 5,433,050; and U.S. Pat. No. Des. 249,966.

While these devices fulfill their respective, particular objectives and requirements, the aforementioned patents do not disclose a new insulating tile. The inventive device includes front and back plates each having inner and outer surfaces. Around the outer perimeter of the front plate is a side wall outwardly extending from its inner surface. The terminal edge of the side wall is coupled to the inner surface of the back plate to form a substantially air tight seal therebetween. The inner surfaces of the plate members are spaced apart to define an insulating interior space between them. A closure tab is outwardly extended from the inner surface of the front plate and is inserted into an aperture extending through the inner and outer surfaces of the back plate. The closure tab is designed for providing a substantially air tight closure of the aperture. The air pressure within the interior space is less than the relative air pressure of the environment surrounding the exterior of the insulating tile to provide further insulation properties to the interior space.

In these respects, the insulating tile according to the present invention substantially departs from the conventional concepts and designs of the prior art, and in so doing provides an apparatus primarily developed for the purpose of providing heat and sound insulation to wall and floor surfaces.

SUMMARY OF THE INVENTION

In view of the foregoing disadvantages inherent in the known types of insulating wall and floor tiles now present in the prior art, the present invention provides a new insulating tile construction wherein the same can be utilized for providing heat and sound insulation to wall and floor surfaces.

The general purpose of the present invention, which will be described subsequently in greater detail, is to provide a new insulating tile apparatus and method which has many of the advantages of the insulating wall and floor tiles mentioned heretofore and many novel features that result in a new insulating tile which is not anticipated, rendered obvious, suggested, or even implied by any of the prior art insulating wall and floor tiles, either alone or in any combination thereof.

To attain this, the present invention generally comprises front and back plates each having inner and outer surfaces. Around the outer perimeter of the front plate is a side wall outwardly extending from its inner surface. The terminal edge of the side wall is coupled to the inner surface of the back plate to form a substantially air tight seal therebetween. The inner surfaces of the plate members are spaced apart to define an insulating interior space between them. A closure tab is outwardly extended from the inner surface of the front plate and is inserted into an aperture extending through the inner and outer surfaces of the back plate. The closure tab is designed for providing a substantially air tight closure of the aperture. The air pressure within the interior space is less than the relative air pressure of the environment surrounding the exterior of the insulating tile to provide further insulation properties to the interior space.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new insulating tile apparatus and method which has many of the advantages of the insulating wall and floor tiles mentioned heretofore and many novel features that result in a new insulating tile which is not anticipated, rendered obvious, suggested, or even implied by any of the prior art insulating wall and floor tiles, either alone or in any combination thereof.

It is another object of the present invention to provide a new insulating tile which may be easily and efficiently manufactured and marketed.

It is a further object of the present invention to provide a new insulating tile which is of a durable and reliable construction.

An even further object of the present invention is to provide a new insulating tile which is susceptible of a low cost of manufacture with regard to both materials and labor, and which accordingly is then susceptible of low prices of sale to the consuming public, thereby making such insulating tile economically available to the buying public.

Still yet another object of the present invention is to provide a new insulating tile which provides in the apparatuses and methods of the prior art some of the advantages thereof, while simultaneously overcoming some of the disadvantages normally associated therewith.

Still another object of the present invention is to provide a new insulating tile for providing heat and sound insulation to wall and floor surfaces.

Yet another object of the present invention is to provide a new insulating tile which includes front and back plates each having inner and outer surfaces. Around the outer perimeter of the front plate is a side wall outwardly extending from its inner surface. The terminal edge of the side wall is coupled to the inner surface of the back plate to form a substantially air tight seal therebetween. The inner surfaces of the plate members are spaced apart to define an insulating interior space between them. A closure tab is outwardly extended from the inner surface of the front plate and is inserted into an aperture extending through the inner and outer surfaces of the back plate. The closure tab is designed for providing a substantially air tight closure of the aperture. The air pressure within the interior space is less than the relative air pressure of the environment surrounding the exterior of the insulating tile to provide further insulation properties to the interior space.

Still yet another object of the present invention is to provide a new insulating tile that has a lower air pressure within its interior space than the air pressure of the environment surrounding the exterior of the insulating tile.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is a schematic exploded perspective view of the present invention having spherical spacing tabs.

FIG. 7 is a schematic cross sectional view of the present invention having spherical spacing tabs.

DESCRIPTION OF THE PREFERRED EMBODIMENT

Figure 1:
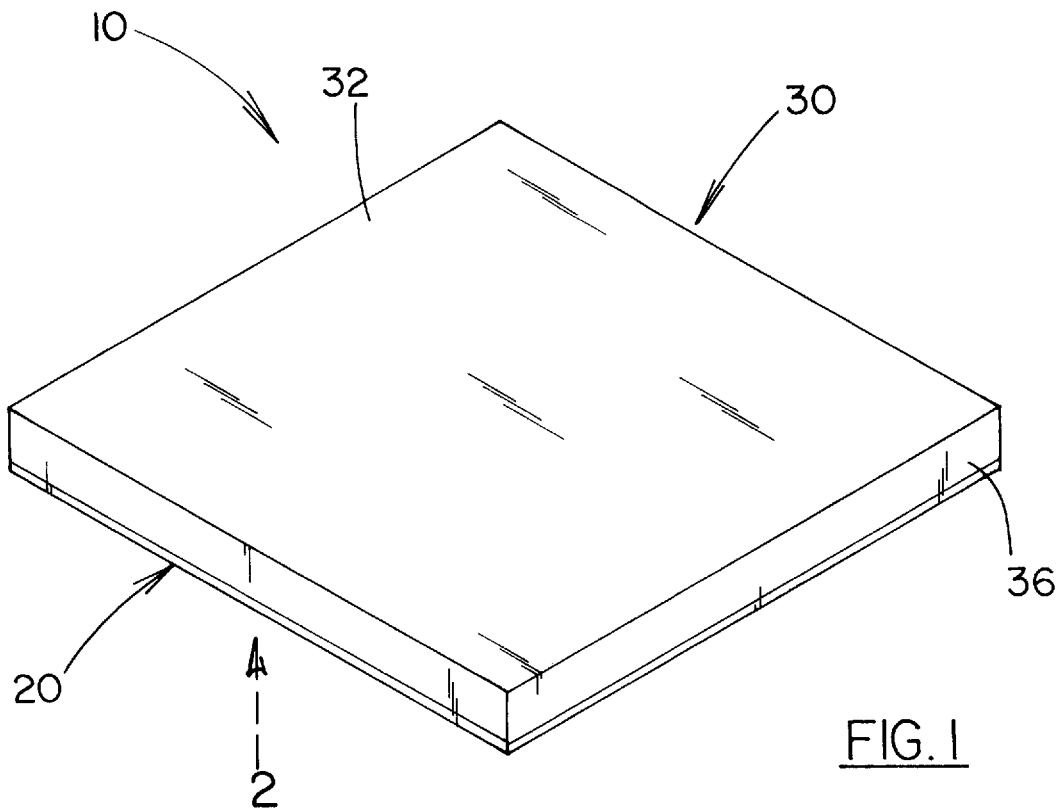
FIG. 1 is a schematic perspective view of a new insulating tile according to the present invention.
Figure 2:
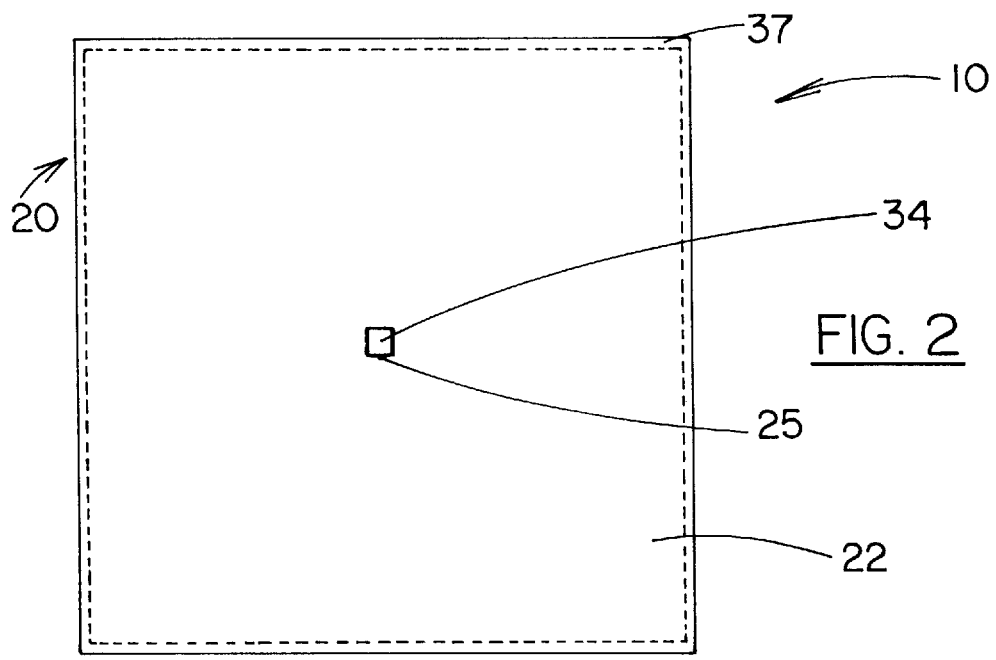
FIG. 2 is a schematic back side view of the present invention.

With reference now to the drawings, and in particular to FIGS. 1 through 7 thereof, a new insulating tile embodying the principles and concepts of the present invention and generally designated by the reference numeral 10 will be described.

As best illustrated in FIGS. 1 through 7, the insulating tile 10 generally comprises front and back plates 30,20 each having inner 31,21 and outer 32,22 surfaces. Around the outer perimeter of the front plate 30 is a side wall 36 outwardly extending from its inner surface 31. The terminal edge 37 of the side wall 36 is coupled to the inner surface 21 of the back plate 20 to form a substantially air tight seal therebetween. The inner surfaces 31,21 of the plate members 30,20 are spaced apart to define an insulating interior space 14 between them. A closure tab 34 is outwardly extended from the inner surface 31 of the front plate 30 and is inserted into an aperture 24 extending through the inner and outer surfaces 21,22 of the back plate 20. The closure tab 34 is designed for providing a substantially air tight closure of the aperture 24. The air pressure within the interior space 14 is less than the relative air pressure of the environment surrounding the exterior of the insulating tile.

Figure 4:
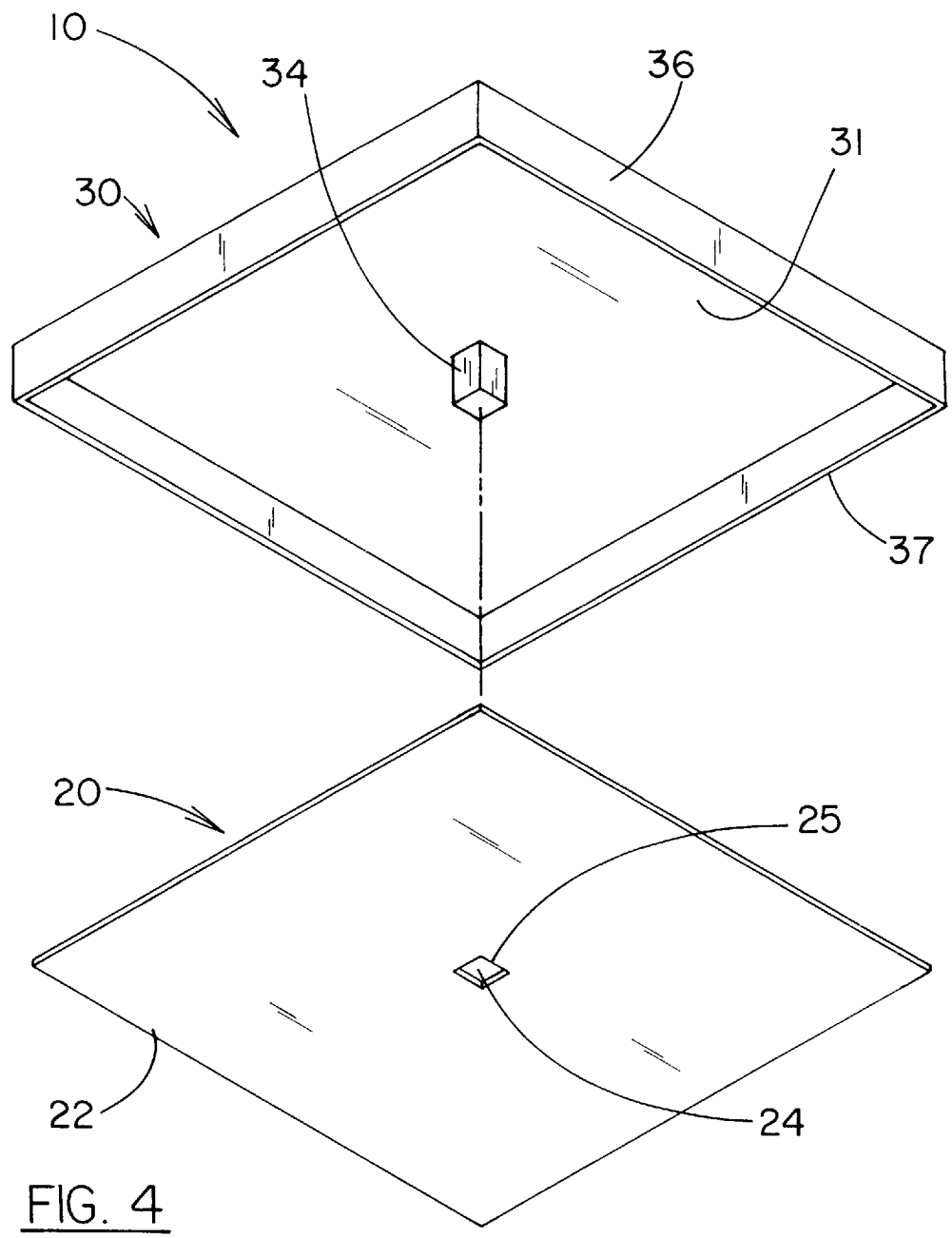
FIG. 4 is a schematic exploded perspective view of the present invention.

The back surface 20 tile 10 is mountable to a surface such as a wall or a floor to provide sound and heat insulation thereto. While the insulating tile 10 may be constructed into any appropriate shape useful for wall and floor tiles, ideally, the back plate, and the front plate are generally rectangular in shape as shown in the FIGS. In this ideal embodiment, it is also preferred that the perimeter rim forming the aperture 24 and closure tab 34 be rectangular in shape. Also preferably, the aperture 24 and the closure tab 34 are centrally located in their respective plate 20,30 as shown in FIG. 4.

Figure 3:
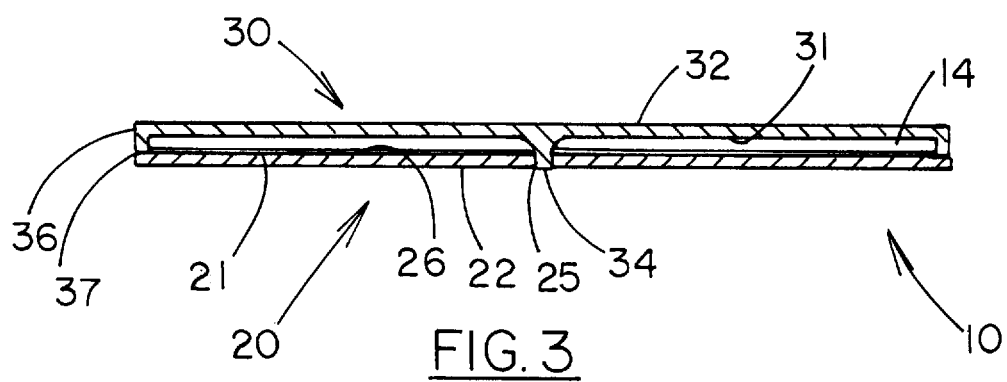
FIG. 3 is a schematic cross sectional view of the present invention.

With reference to FIG. 3, the inner surface 21 of the back plate 20 is preferably heat reflective to reflect heat away from the inner surface 21. Ideally, the heat reflective character of the inner surface 21 of the back plate 20 is provided by a heat reflective coating 26 on the inner surface 21.

The side wall 36 is outwardly extended from the inner surface 31 of the front plate 30 around the outer perimeter of the front plate 30. With particular reference to FIG. 3, the terminal edge 37 of the side wall is outwardly extended from the inner surface 31 of the front plate 30. The terminal edge 37 is coupled to the inner surface 21 of the back plate 20 to form a substantially air tight seal between them to block the passage of air therethrough between the insulating interior space 14 and the exterior of the insulating tile 10.

The closure tab 34 of the front plate 30 is inserted into the aperture 24 of the back plate 20 for providing a substantially air tight closure of the aperture 24 of the back plate. The closure tab 34 may be constructed so that it alone provides the air tight closure of the aperture 24. However, ideally, the closure tab 34 is also coupled to the perimeter rim 25 that defines the aperture 24 to form a substantially air tight seal between the rim 25 and the closure tab 34.

Figure 5:
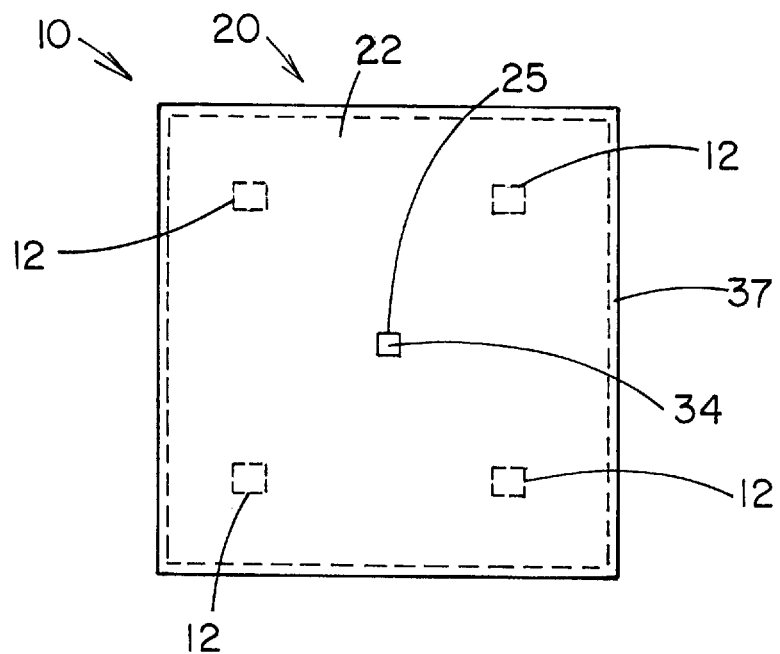
FIG. 5 is a schematic back side view of the present invention having rectangular spacing tabs.

With reference to FIGS. 5, 6, and 7, the insulating tile may also include a plurality of spaced apart spacing tabs 12 disposed within the interior space 14 between the inner surfaces 31,21 of the front and back plates 30,20. The spacing tabs 12 are designed for helping maintain the spacing between the inner surfaces 31,21 the front and back plates 30,20 when pressure is exerted on the plates from their the outer surfaces 32,22, especially when the tile 10 is used as a floor tile. Preferably, the spacing tabs 12 abut the inner surfaces 31,21 and, ideally, the spacing tabs 12 are also coupled to the inner surfaces 31,21 of the front and back plates 30,20. Optionally, as shown in FIGS. 6 and 7, the spacing tabs 12 generally spherical in shape so that contact between the tabs 12 and the plates 20,30 is minimized to help limit the amount of sound passing through the tile 10 between the plates 20,30.

In use, air within the interior space 25 is removed so that the air pressure within the interior space 25 is less than the relative air pressure of the environment surrounding the exterior of the insulating tile 10. Ideally, this is accomplished by first coupling the side wall 36 of the front plate 30 to the back plate 20. The back plate 20 is pulled away from the front plate 30, ideally by suction applied to the outer surface 22 of the back plate 20. The back plate 20 is pulled away so that the rim 25 of the aperture 24 is pulled away from the closing tab 36 to open the aperture. Air within the interior space 14 is then removed through the open aperture 24. When sufficient air is removed, the back plate 20 is moved back towards the front plate (aided by the negative air pressure within the space 14) to close the aperture 24 with the tab 34. The aperture rim 25 may then be coupled to the tab 34 to substantially seal the closure.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An insulating tile, comprising:
    a back plate having inner and outer surfaces, and a aperture extending therethrough;
    a front plate having inner and outer surfaces, an outer perimeter, a side wall, and a closure tab;
    said side wall of said front plate being outwardly extended from said inner surface of said front plate around said outer perimeter of said front plate, said side wall having a terminal edge, said terminal edge of said side wall of said front wall being coupled to said inner surface of said back plate to form a substantially air tight seal therebetween, said inner surface of said front plate member and said inner surface of said back plate member being spaced apart to define an interior space therebetween;
    said closure tab of said front plate being outwardly extended from said inner surface of said front plate, said closure tab of said front plate being inserted into said aperture of said back plate for providing a substantially air tight closure of said aperture of said back plate; and
    wherein the air pressure within said interior space is less than the relative air pressure of the environment surrounding the exterior of said insulating tile.

2. The insulating tile of claim 1, wherein said back plate, and said front plate are generally rectangular.

3. The insulating tile of claim 1, wherein said closure tab is generally rectangular.

4. The insulating tile of claim 1, wherein said aperture of said back plate is centrally located in said back plate, and wherein said closure tab of said front plate is centrally located on said inner surface of said front plate.

5. The insulating tile of claim 1, wherein said inner surface of said back plate is heat reflective.

6. The insulating tile of claim 5, wherein said heat reflective character of said inner surface of said back plate is provided by a heat reflective coating on said inner surface of said back plate.

7. The insulating tile of claim 1, further comprising a plurality of spaced apart spacing tabs being disposed within said interior space between said inner surfaces of said front and back plates.

8. The insulating tile of claim 7, wherein said spacing tabs abut said inner surfaces of said front and back plates.

9. The insulating tile of claim 8, wherein said spacing tabs are coupled to said inner surfaces of said front and back plates.

10. The insulating tile of claim 7, wherein said spacing tabs are generally spherical.

11. An insulating tile, comprising:
    a back plate being generally rectangular and having inner and outer surfaces, and a aperture extending therethrough;
    said aperture of said back plate being centrally located in said back plate;
    said inner surface of said back plate being heat reflective, wherein said heat reflective character of said inner surface of said back plate is provided by a heat reflective coating on said inner surface of said back plate;
    a front plate being generally rectangular and having inner and outer surfaces, an outer perimeter, a side wall, and a closure tab;
    said side wall of said front plate being outwardly extended from said inner surface of said front plate around said outer perimeter of said front plate, said side wall having a terminal edge, said terminal edge of said side wall of said front wall being coupled to said inner surface of said back plate to form a substantially air tight seal therebetween, said inner surface of said front plate member and said inner surface of said back plate member being spaced apart to define an interior space therebetween;
    said closure tab of said front plate being generally rectangular and being outwardly extended from said inner surface of said front plate, said closure tab of said front plate being centrally located on said inner surface of said front plate, said closure tab of said front plate being inserted into said aperture of said back plate for providing a substantially air tight closure of said aperture of said back plate;
    a plurality of spaced apart spicing tabs being disposed within said interior space between said inner surfaces of said front and back plates, said spacing tabs abutting said inner surfaces of said front and back plates, said spacing tabs being coupled to said inner surfaces of said front and back plates, said spacing tabs being generally spherical; and
    wherein the air pressure within said interior space is less than the relative air pressure of the environment surrounding the exterior of said insulating tile.

* * * * *